July 7, 1970  H. A. PADGETT, SR  3,519,086
ADJUSTABLE CULTIVATOR SHOE MOUNTING DEVICE
Filed April 10, 1967
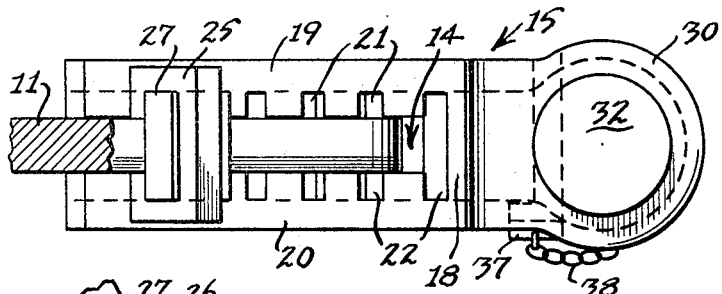
Fig. 2
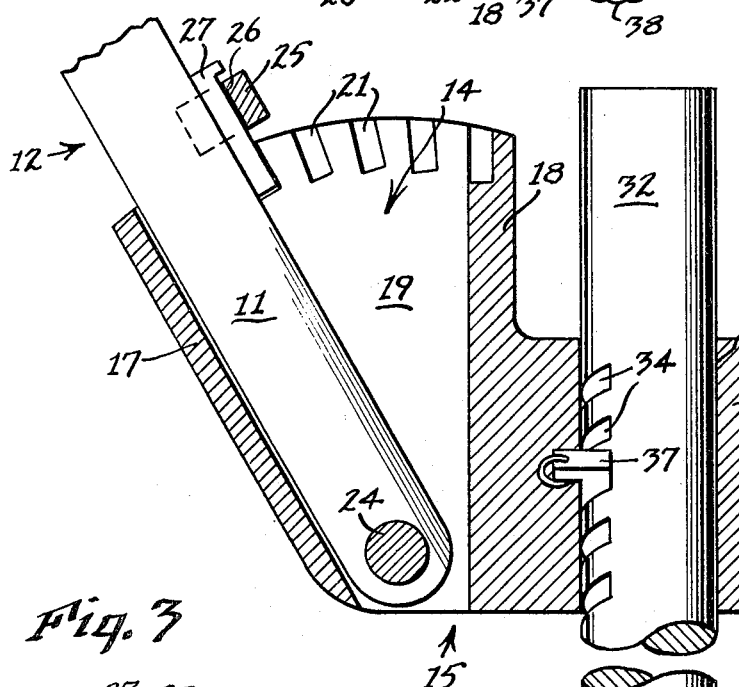
Fig. 3
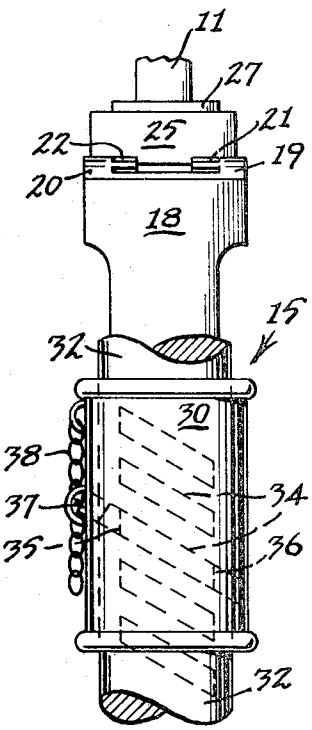
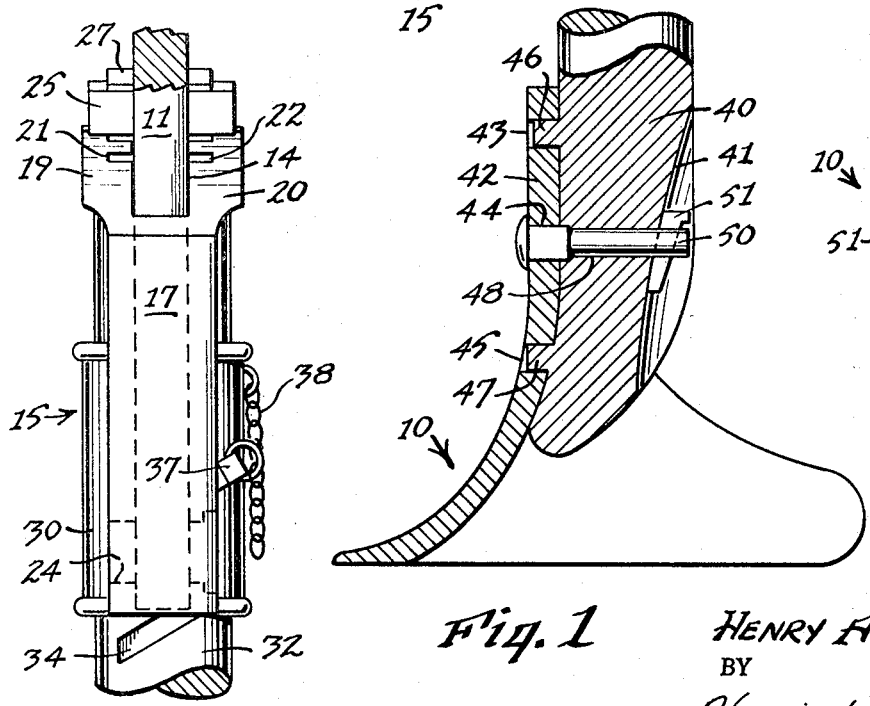
Fig. 1
Fig. 4
INVENTOR:
HENRY A. PADGETT, SR.
BY
Harrington A. Lackey
ATTORNEY United States Patent Office 3,519,086
Patented July 7, 1970

3,519,086
ADJUSTABLE CULTIVATOR SHOE MOUNTING DEVICE
Henry A. Padgett, Sr., Rte. 1, Monetta, S.C. 29105
Filed Apr. 10, 1967, Ser. No. 629,449
Int. Cl. A01b 23/02, 39/22
U.S. Cl. 172—763                                    2 Claims

ABSTRACT OF THE DISCLOSURE

A cultivator shoe mounting device having a journal housing pivotally connected to a cultivator arm and a cultivator shoe standard axially received in the journal housing, and latching mechanism for pivotally adjusting the cultivator arm in the housing, axially positioning the standard in the housing and detachably securing a shoe to the standard.

BACKGROUND OF THE INVENTION

This invention relates to an adjustable mounting device for a cultivator shoe, and more particularly to a mounting device for adjustably and detachably securing the cultivator shoe to the cultivator arm.

Plow shoes or cultivator shoes have typically been detachably mounted on the shank portion of a cultivator arm in a fixed position by nuts and bolts. Although the mere screwing and unscrewing of a nut upon a threaded bolt is a tedious manual task in itself, the difficulty of the job is compounded when the nut and bolt are exposed to the elements and also to rough usage, such as encountered by a cultivator shoe operating in the soil. If a shoe becomes worn or damaged, considerable down-time results in the removal of several nuts and bolts, some of which are rusty, worn or jammed, removing the plow shoe and replacing it with a new plow shoe, and then reinstalling the same number of nuts and bolts.

Moreover, the frequency of replacement of plow shoes is increased where the shoe is supported on a fixed mounting and the shoe cannot be adjusted to accommodate soils of varying densities, depths or constitution. Thus, a plow shoe which is rigidly bolted in place for deep cultivation of a soft soil will more readily become damaged and require replacement where it encounters hard or rocky soil.

SUMMARY OF THE INVENTION

It is therefore an object of this invention to provide a mounting device for a cultivator shoe in which the shoe may be quickly and easily removed from its standard and replaced.

Another object of this invention is to provide a mounting device for a cultivator shoe in which nuts and bolts as securing means have been completely eliminated and replaced by pins and pin holes.

A further object of this invention is to provide a mounting device for a cultivator shoe in which the shoe may be quickly and easily mounted in a variety of different positions relative to the cultivator arm.

Another object of this invention is to provide a mounting device for a cultivator shoe in which the shoe may be adjusted both vertically and pivotally relative to the cultivator arm.

Another object of this invention is to provide a cultivator shoe mounting device incorporating several component parts, all of which are connected by pin elements which may be easily and quickly inserted and removed, yet provided with means for securing the pins against accidental displacement.

BRIEF DESCRIPTION OF THE DRAWING

FIG. 1 is a sectional elevation of the mounting device for a cultivator shoe made in accordance with this invention, showing the cultivator arm fragmentarily;

FIG. 2 is a top plan view of the mounting device disclosed in FIG. 1;

FIG. 3 is a fragmentary front elevational view of the mounting device of FIG. 1; and FIG. 4 is a fragmentary rear elevation of the mounting device disclosed in FIG. 1, with the cultivator shoe removed.

DESCRIPTION OF THE PREFERRED EMBODIMENT

Referring now to the drawings in more detail, FIG. 1 discloses a device for mounting a conventional cultivator shoe 10 upon the shank portion 11 of a cultivator arm 12 of a type similar to that disclosed in the co-pending application No. 629,450 of Henry A. Padgett, Sr. for "Cultivator Arm." The cultivator arm 12 extends upwardly where it is secured to a cultivator frame, which in turn is mounted upon or connected to a prime mover, such as a tractor, for moving the cultivator frame including one or more cultivator arms 12 each supporting a cultivator shoe 10 for cultivating the soil.

In this invention, the shank portion 11 is received in the shank cavity 14 of a journal housing 15. The shank cavity 14 has a forward end wall 17 and a rear end wall 18 which converge downwardly and are connected by opposed side walls 19 and 20 having aligned arcuate top edges. Formed in the top edges of the side walls 19 and 20 are a plurality of arcuately spaced and transversely aligned notches 21 and 22. A journal pin 24 extends through the bottom portion of both side walls 19 and 20 and through the bottom end of the shank portion 11 to pivotally support the cultivator arm 12 for pivotal movement relative to the journal housing 15. In actual practice, the journal housing 15 pivots about the cultivator arm 12 to adjust the position of the shoe 10. The converging front and rear walls 17 and 18 provide the pivotal limits of the housing 15 about the shank portion 11. The arcuate top edges of the side walls 19 and 20 are disclosed as true circular arcs described about the pivotal axis of the journal pin 24 as a center.

In order to maintain the housing 15 and the shank portion 11 in any pivotally adjusted position, a loop strap or bracket 25 is fixed transversely across the rear edge of the shank portion 11 to provide a transverse opening 26 for slidably receiving a latch pin 27. The width of the latch pin 27 is great enough to span the cavity 14 and simultaneously engage any aligned pair of notches 21, depending upon the relative pivotal position of the shank portion 11 and the cavity 14. Thus, in order to pivotally adjust the journal housing 15 relative to the cultivator arm 12, the latch pin 27 is raised axially of the shank portion 11 in its slot 26 until it dis-engages the notches 21, and is held in raised position while the shank portion 11 is pivoted about the journal pin 24 to any desired pivotally adjusted position. The latch pin 27 is then released to drop into an aligned pair of notches 21 and 22 to secure the journal housing 15 in a latched position relative to the cultivator arm 12.

The rear portion of the journal housing 15 comprises a cylindrical collar 30 having a substantially vertical cylindrical passage or guideway 31 for slidably receiving a cultivator shoe standard 32 for coaxial reciprocable movement in said passage 31. The major upper portion of the shoe standard 32 is also cylindrical to slidably fit the cylindrical passageway 31.

Spaced axially along the front surface of the standard 32 are a plurality of straight parallel slots 34. Each slot 34 is disposed at an acute angle to any radial plane of the standard 32 intercepting the slot 34. Disposed at the same angle in the walls of the passage 31 in the front portion of the collar 30, as best disclosed in FIGS. 2 and 4, are an upper pin hole 35 and a lower pin hole 36 in axial alignment with each other and with any slot 34 in registry with the holes 35 and 36.

Adapted to be received in the pin holes 35 and 36 and any one slot 34 in registry with the pin holes 35 and 36 is a locking pin 37. The locking pin 37 may be secured to the collar 30 by means of a chain 38 to prevent loss of the pin 37 when removed from the pin holes 35 and 36.

Thus, the shoe standard 32 may be vertically or axially adjustable with respect to the journal housing 15 by removing the locking pin 37, and axially moving the standard 32 in either direction until the desired axial location of the standard is obtained and the pin holes 35 and 36 are aligned with one of the slots 34. The pin 37 is then inserted in the upper pin hole 35, and the pin 37 passes through the registering slot 34 into the lower pin hole 36 to maintain the standard 32 in fixed position relative to the journal housing 15.

The slanting of the slots 34 at a decided angle to any radial plane of the standard 32 permits the pin 37 to be retained in operative position by gravity so it will not be accidentally removed by vibrations or occasional abrupt impacts caused by the shoe 10 contacting hard surfaces or objects.

The lower portion 40 of the standard 32 has its rear portion cut away to provide a recessed back face 41.

The conventional cultivator shoe 10 includes a front or leading wall 42 having three vertically spaced bolt holes, an upper hole 43 a central hole 44 and a lower hole 45. In order to adapt the standard 32, made in accordance with this invention, to detachably receive a conventional cultivator shoe 10, the front side of the lower portion of the standard 40 is provided with an upper projection lug 46 adapted to register with and be received in the upper hole 43, and a lower projection or lug 47 adapted to register with and be received in the lower hole 45. A central pin hole 48 is formed entirely through the lower portion of the standard 40, from front to rear, and is adapted to register with the central hole 44 in the shoe 10 and extend through the back face 41. An unthreaded bolt or securing pin 50 may then be easily inserted through the central opening 44 and the pin hole 48 to project through and beyond the back face 41. The portion of the securing pin 50 projecting beyond the back face 41 is provided with a diametrical slot therethrough for receiving the latch key 51.

It will thus be seen that by merely removing the latch key 51 from its corresponding slot, not shown, in the pin 50, the pin 50 may be easily withdrawn forwardly, and the shoe 10 easily removed from the lower portion of the standard 40. A new or repaired shoe 10 may then just as easily be remounted by the reverse operation of fitting the upper and lower holes 43 and 45 over their corresponding projecting lugs 46 and 47, which automatically locates and aligns the central hole 44 with the pin hole 48. The pin 50 is then quickly re-inserted and the key 51 or wedge inserted into its corresponding slot and wedged tight so that the shoe 10 is firmly and rigidly locked to the bottom 40 of the standard 32.

It will therefore be readily apparent that a very versatile mounting device for a conventional cultivator shoe 10 has been designed for adjustable mounting upon a relatively rigid cultivator frame by attachment to the cultivator arm 12. The shoe 10 is capable of being quickly and easily adjusted vertically by means of the locking pin 37 and slots 34 to any desired elevation relative to the housing 15, and consequently relative to the cultivator frame. Moreover, the angle of the cultivator shoe 10 relative to the ground may be adjusted by means of the pivotal connection between the shank portion 11 and the shank cavity 14 by simply raising and lowering the latch pin 27 for insertion into the desired corresponding notches 21 and 22.

If desired, one or more of the pins 27 and 37 or the latch key 51 may be reduced in strength so that that particular key or pin may serve as a shear pin in order to protect the cultivator shoe 10, standard 32, journal housing 15 and cultivator arm 12 from excessive forces which might damage one of these parts.

Chains similar to chain 38 may also be attached to pin 27 and latch key 51 to secure them to the shank portion 11 and lower standard portion 40, respectively.

What is claimed is:

1. An adjustable cultivator shoe mounting device comprising:
   (a) a unitary journal housing comprising a shank cavity and a collar,
   (b) said shank cavity having downward converging front and rear end walls and spaced side walls,
   (c) a cultivator arm having a shank portion received in said shank cavity,
   (d) a journal pin extending through said shank portion and the lower portions of said side walls to permit relative pivotal movement of said shank cavity and said shank portion in the direction of said end walls,
   (e) latch means for securing said shank portion in various pivotally adjusted positions within said shank cavity,
   (f) said collar being dimensionally stable and having a longitudinal axis in the pivotal plane of said arm,
   (g) a shoe standard having a longitudinal axis and received in said collar for axial, reciprocable movement,
   (h) a plurality of axially spaced parallel slots along one side of said standard, each slot being straight and disposed at an acute angle to the longitudinal axis of said standard,
   (i) aligned pin holes in said collar adapted to register with any one of said slots,
   (j) a locking pin received in said pin holes and an aligned slot,
   (k) a cultivator shoe, and
   (l) detachable means fixing said shoe to said standard,
   (m) the dimensions of said slots and pin being of close tolerance to prevent relative rotation between the collar and standard.

2. The invention according to claim 1, in which said shoe comprises an upstanding front wall having an upper hole, a central hole, and a lower hole, upper and lower lugs projecting forward from the bottom portion of said standard and registering with said upper and lower holes, said detachable means comprising a pin hole extending through the bottom portion of said standard in alignment with said central hole, a securing pin extending through said central hole and said pin hole, and a latch key detachably connected to said securing pin for holding said shoe fixed to said standard.

References Cited

UNITED STATES PATENTS

| | | | |
|---|---|---|---|
| 271,143 | 1/1883 | Smith. | |
| 966,411 | 8/1910 | Allen | 172—753 X |
| 987,487 | 3/1911 | Pledger et al. | 172—739 X |
| 1,077,455 | 11/1913 | Copehagen | 172—683 X |
| 1,544,795 | 7/1925 | Barrett | 172—739 |
| 3,010,744 | 11/1961 | Hollis. | |
| 1,613,693 | 1/1927 | Davis | 279—97 |

ROBERT E. PULFREY, Primary Examiner

A. E. KOPECKI, Assistant Examiner

U.S. Cl. X.R.

172—740, 744; 306—1.6